Patented June 30, 1925.

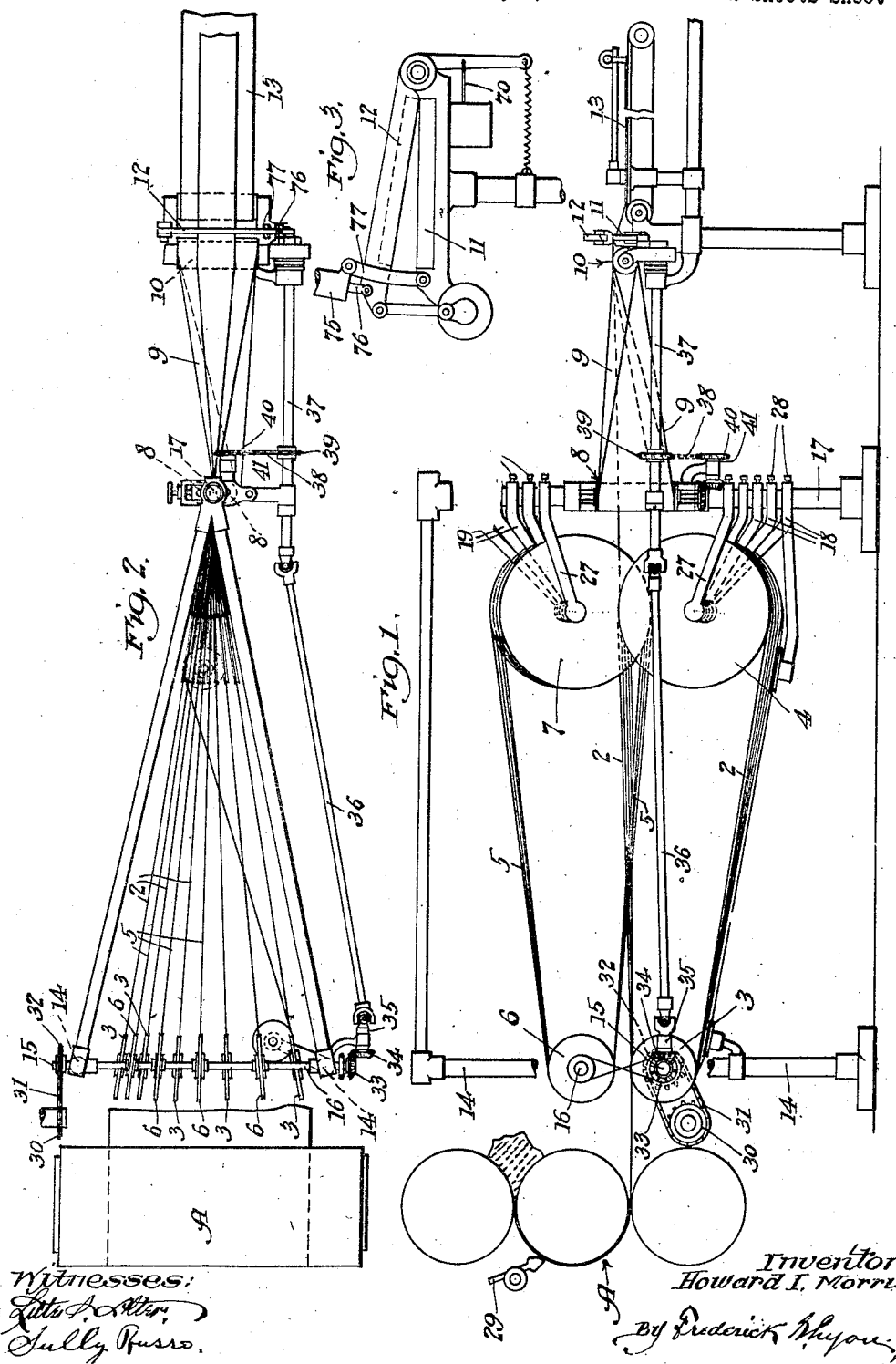

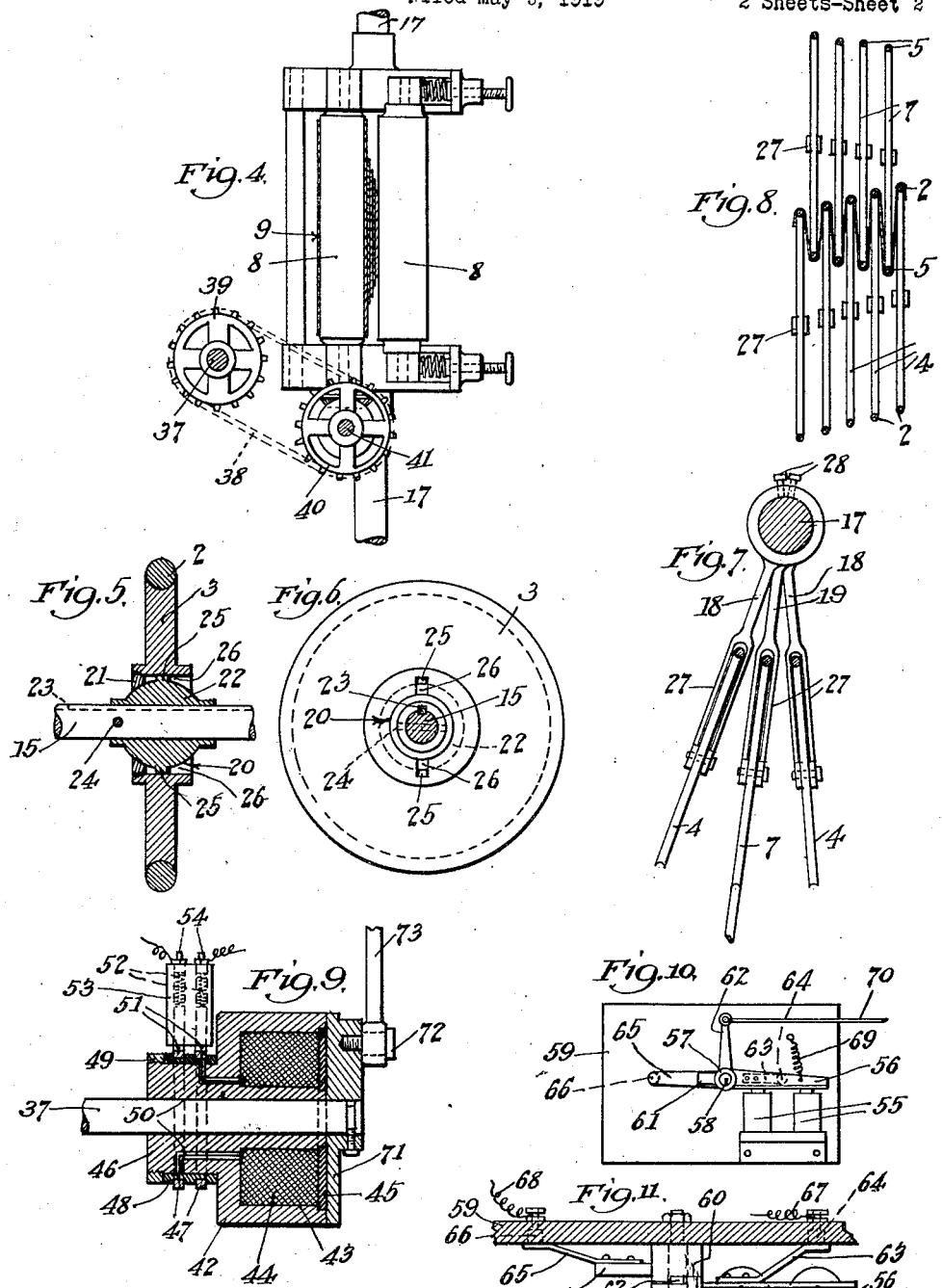

1,544,065

UNITED STATES PATENT OFFICE.

HOWARD I. MORRIS, OF LOS ANGELES, CALIFORNIA, ASSIGNOR, BY MESNE ASSIGNMENTS, TO THE YODER-MORRIS COMPANY, OF CLEVELAND, OHIO, A CORPORATION OF OHIO.

METHOD AND APPARATUS FOR MAKING TIRE TREADS.

Application filed May 5, 1919. Serial No. 294,733.

*To all whom it may concern:*

Be it known that I, HOWARD I. MORRIS, a citizen of the United States, residing at Los Angeles, in the county of Los Angeles and State of California, have invented a new and useful Method and Apparatus for Making Tire Treads, of which the following is a specification.

This invention relates to a novel method of and to an apparatus for making rubber tire treads for vehicle tires and more particularly to the production of a tire tread for pneumatic or automobile tires.

The invention relates to a method of producing such a tire tread consisting in producing a thin sheet of heated rubber, conveying the heated sheet of rubber along, and simultaneously folding such sheet and then compressing the folded sheet in such manner as to produce a rubber element or tire tread therefrom. Preferably such rubber element or tire tread is pyramidal in form, this being accomplished by so manipulating the rubber sheet that each successive fold is of less width than the preceding fold. Preferably each fold is so positioned that the centers of the several folds register with one another.

The invention further relates to means whereby a thin sheet of rubber is folded as it is conveyed along and then the folded portions compressed into one homogeneous mass.

The invention further consists in means for automatically cutting the tread strip or element produced into the desired lengths.

Other object of the invention will hereinafter appear from the following description of a preferred embodiment thereof and will be more readily understood by reference to the accompanying drawings, illustrating a preferred form of my apparatus, in which—

Figure 1 is a side elevation.

Fig. 2 is a plan view thereof.

Fig. 3 is a partial sectional view illustrating the knife or shearing means for cutting the strip into predetermined lengths.

Fig. 4 is a side elevation of the compressing rolls by which the folded rubber sheet is compressed into a homogeneous mass.

Figs. 5 and 6 are sectional detail views illustrating the universal mounting of one set of sheaves upon their shaft.

Fig. 7 is a detail sectional view illustrating the mounting of the second set of sheaves upon a vertical standard at the delivery end of the folding mechanism.

Fig. 8 is a diagrammatic view of the positions of the several folds of the rubber sheet just previous to the discharge of the sheet from the folding mechanism and into the compressing means, and showing the positions of the two sets of cables and sheaves with respect to each other and to the several folds of the rubber sheet.

Fig. 9 is a sectional view illustrating the magnetic clutch preferably employed in the actuation of the automatic shearing or cutting means.

Figs. 10 and 11 are sectional details illustrating the relay and circuit connections, controlling the magnetic clutch, and the means for closing and breaking such circuit.

The tread or rubber element, embodying my invention and produced by my method and apparatus, is formed from a single piece of rubber. This piece of rubber has been first produced in a thin plastic sheet. Preferably such sheet is taken directly from the calender and folded in such manner that the centers of each fold register. Preferably such rubber element or tread is pyramidal in form, this being accomplished by so manipulating the rubber sheet that each successive fold is of less width than the preceding fold. After the sheet has thus been folded the folded product is compressed into a homogeneous mass by suitable pressure means.

I prefer to take the hot thin plastic sheet of rubber directly from the calender and to receive it upon suitable conveying means which, while supporting the sheet, permit suitable portions thereof to drop down from the line of support and form folds. Such a thin sheet of pastic rubber if not supported for its full width will, by gravity, drop down or sag at the unsupported portions, thus forming folds. If the sheet of rubber is supported as it is carried along upon equidistantly spaced conveying or supporting means, the folds thus caused by gravity will be substantially equal. Since, therefore, it is desired to make up a rubber element or tire tread for tires in which the folds are successively or progressively of less width and so formed from the sheet that the centers of the folds all register when the folds are pressed together, it is necessary that the spaced conveying and supporting means shall converge toward each other as the sheet of rubber is carried along, and it is also necessary that the spaced supporting or conveying means shall be spaced apart to correspond with the required folds. That is to say, if the wider fold is to be formed from the right side of the sheet as conveyed along the space between the right hand edge or marginal support of the rubber and the next support to the left thereof will determine the width of the fold as the rubber sags or drops therebetween. By arranging the next succeeding support at a less distance the fold therebetween will be of less width than the first fold and progressively each fold will be of less width as each succeeding support is brought nearer to the previous support.

In the drawings I have illustrated a preferred form of my apparatus which preferably comprises a series of converging wires or cables 2 running over suitable sheaves 3, 4, and upon which the thin plastic sheet of rubber is supported. Preferably the plastic sheet of rubber extends slightly beyond the cables at both sides so that a small portion of rubber drops down by gravity at the outside edge of the respective outside cables. Preferably these cables are mounted upon the sheaves 3, 4, so as to form a continuous belt or conveyer. At the receiving end these sheaves 3 are spaced apart so that the distance between the respective outside sheaves is slightly less than the width of the rubber sheet to be folded, while at the discharge end of such conveying and folding mechanism the sheaves 4 are arranged very close together. Each pair of sheaves may be provided with a single cable forming a continuous belt about such pair of sheaves, or one continuous wire cable may be used running from one pair of sheaves back to the next pair and thereover and thus progressively running over all of the sheaves and after passing over the last sheave to be brought back to the first sheave in any well known manner.

While a sheet of thin plastic rubber thus carried upon the spaced conveying means will sag and drop by gravity in between the respective cables and thus form folds therein, I prefer to provide positive means for insuring such folding and for holding the folds in position. In the drawings I have illustrated such means as a second set of cables 5, carried by suitable sheaves 6, mounted at the receiving end above the conveyer sheaves 3 and running over sheaves 7 at the discharge end, such sheaves 7 being arranged in staggered relation with respect to the sheaves 4 at the discharge end of the conveyer so that they extend down between adjoining sheaves thereof. The second set of cables 5 thus carried by these sheaves crosses through between the respective conveyer cables at a point between the receiving end of the conveyer cables and the discharge end thereof and by means of such cables the sagging portions of the rubber sheet between the respective conveyer cables are carried down and folded about such cables and held in position thereby.

After the rubber sheet has thus been conveyed over the cables 2 and discharged off the end thereof in folded position, the same is received between a pair of compressing rolls 8. These rolls are vertically arranged, being thus in position to receive the folded sheet directly from the conveying and folding means just referred to and to compress the folds together so that the sheet in this folded and positioned condition is compacted and formed into a homogeneous mass. From such compression rolls 8 the compressed tread or strip is delivered onto a conveyer belt 9. This conveyer belt passes around one of the vertical compression rolls 8 and around a horizontal idler roll 10 and thence back around the compression roll 8. It is thus seen that this belt makes a quarter-turn so that as it leaves the compression roll 8 and moves along toward the roll or sheave 10 it twists from a vertical to a horizontal position.

The compressed strip is carried along with and supported by this conveyer 9 and from the end thereof passes through between the two blades 11 and 12 of the shear and thence onto the conveyer 13.

14 indicates suitable standards of the frame of the machine adapted to support a shaft 15 at the receiving end and upon which the sheaves 3 are mounted. Above this shaft 15 is a second shaft 16 upon which the sheaves 6 are mounted. 17 represents a vertical standard of the frame at the discharge end of the folding mechanism and upon this standard 17 are mounted the respective brackets or arms 18, 19, carrying the sheaves 4 and 7, respectively. Supported from this standard 17 and in a suitable frame are the compression rolls 8 (shown best in Fig. 4). One of the compression rolls 8 is preferably mounted in spring pressed boxes or bearings and thereby held in resilient contact with the companion roll 8. As indicated in the drawings means may be provided for adjusting the tension of the springs and thereby the pressure of the rolls.

In order to fold the sheet of rubber in such manner as to make a pyramidal tread of the folds, I prefer to use a conveyer, the supporting elements of which converge from the receiving end to the discharge end. For this purpose I have preferably arranged the supporting cables 2 radially to the point of contact between the vertical compression rolls 8. To provide for this and to utilize a single shaft for the sheaves 3 I mount each of the sheaves 3 upon such shaft 15 on a ball and socket or universal joint.

Referring to Figs. 5 and 6 of the drawings, the hub of the sheave 3 has a spherical bore 20 and is provided with a removable ring 21 also having a spherical bore. This ring 21 is removable to permit the insertion of the ball-shaped hub or collar 22 which is slidably keyed to the drive shaft 15 by a key 23. Preferably this key 23 runs the entire length of the shaft 15. The ball hub 22 may be locked to prevent sliding upon the shaft 15 by the insertion of a pin 24 into a suitable hole drilled through the end of the hub 22 and into the shaft 15. The hub 22 has on its opposite sides and at right angles to the shaft 15 two round pins or studs 25. These pins 25 project a short distance from the surface of the ball 22 and engage loosely the walls of the keyways 26 of the hub of the sheave 3, thus insuring a positive drive of the sheave through these pins 25 while the keyways 26 permit the sheave to have a ball and socket or universal action about the hub 22, the pins 25 sliding, as well as rotating, within the keyways 26.

The sheaves 6 are preferably respectively mounted upon the shaft 16 by ball and socket or universal joint connections similar to those just described in connection with the sheaves 3 and illustrated in Figs. 5 and 6.

In Fig. 7 of the drawings I have illustrated in detail the manner of mounting the sheaves 4, 7, upon the vertical standard 17. Each sheave 4, 7, is mounted in a yoke 27 of the respective brackets 18, 19. The ends of these brackets 18, 19, are formed with eyes adapted to encircle a rounded portion of the standard 17 and are each provided with a set screw 28 by means of which the brackets are fastened in position after having been properly aligned. While each of the brackets 18 and each of the brackets 19 is substantially the same in construction the length of the brackets differs as does the angle of their bend, such angles and lengths varying so as to bring all of the yokes 27 of the brackets 18 in horizontal alignment and also to bring all of the yokes of the brackets 19 in horizontal alignment, and, preferably, to bring the centers or axes of the sheaves 4, 7, in vertical alignment.

A represents calendar rolls for producing a thin sheet of heated rubber. These rolls may be of the usual or any preferred form or construction and driven or heated in the usual or preferred manner. Two trimming knives 29 are preferably provided for trimming the edges of the sheet. Preferably from a sprocket 30 on a driven shaft of the calender a sprocket chain 31 passes about a sprocket 32 on the shaft 15. The end of the shaft 15 is preferably provided with a bevel pinion 33 with which meshes a pinion 34 on a short shaft 35 mounted on the standard 14. A connecting shaft 36 has one end connected by a universal joint with the shaft 35 and its other end similarly connected with a shaft 37. A sprocket chain 38 runs about the sprocket 39 on the shaft 37 and about a sprocket 40, mounted on a shaft 41, supported from the standard 17. The inner end of the shaft 41 is provided with a beveled gear meshing with a beveled gear on the shaft of one of the compressing rolls 8.

The means for operating the shearing means 11, 12, to automatically cut the tread into predetermined lengths preferably consists of a magnetic clutch for actuating the shears in cutting the treading, and in trigger mechanism for controlling the actuation of the magnetic clutch, and in mechanism for returning the shearing means to rest in position for each operation.

In Fig. 9 a longitudinal cross section of the magnetic clutch, crank disk and brush holder is shown. The magnetic clutch comprises a steel or iron shell 42 having an annular recess 43 containing the magnetizing coil of wire 44, which coil is retained in place by the ring of fibre 45. The shell 42 has a cylindrical hub extension 46 upon and around which are mounted two electrical collector rings 47 in suitable insulating material 48 held in place by a retaining ring 49 secured upon the end of the hub extension 46. The collector rings 47 are connected to the coil 44 by insulated wires 50 (shown diagrammatically). In contact with the outer surface of the collector rings 47 are two brushes 51 held against the rings by springs 52 and enclosed within the brush holder 53 which is provided with two binding screws 54 for connecting the circuit wires thereto.

In Figs. 10 and 11 are shown an elevation and enlarged cross section of the relay in which 55 represents a pair of electro magnets connected in series with the contacts of the trigger mechanism. 56 is the armature of the magnets 55 and has a hub 57 and is pivoted upon the pin 58 which is fastened rigidly in the fibre base 59. Also pivoted upon the same pin 58 is another hub 60 having two arms or levers 61, 62 mounted upon it. Attached to the side of the armature 56 is a contact spring 63 which makes contact with the button 64 when in proper position. Attached to the arm 61 is a contact spring 65 which makes contact with the button 66 when in proper position. It will be noted in Fig. 11 that the hubs 57 and 60 are each provided with an interlocking shoulder whereby a movement of one hub will produce a similar movement of the other hub when such shoulders are in contact with each other. However these shoulders are spaced a short distance apart so as to permit a limited movement of one hub independent of the other. It will be noted that the contact springs 63 and 65 make contact with the buttons 64 and 66 only when they lie in direct horizontal alignment and as the wires 67 and 68 are connected through suitable binding screws to the buttons 64, 66 a circuit can only be established when both contacts are made and should either armature 56 or arm 61 be moved upward or arm 62 moved to the right it will move one or the other contact spring 63 or 65 from its respective button and cause a breaking of the circuit. The wires 67 and 68 are connected in series with the magnetic clutch. The armature 56 is normally held away from the magnet 55 by the spring 69, holding the spring 63 out of contact with the button 64, but when the magnets 55 are energized by the trigger mechanism establishing the circuit through them the armature 56 is attracted, making the contact between the spring 63 and button 64, when, as the contact having already been established between the spring 65 and button 66, the circuit will be completed through the magnetic clutch, causing it to attract the disk 71 causing it to rotate with the clutch and rotate the crank 72 pulling down on the shear connecting rod 73 and causing the shear to make the shearing stroke.

The arm 62 is connected to the arm 12 of the shear by the connecting wire or cable 70 so that when the shear has completed the shearing stroke the arm pulls upon the cable 70 which in turn moves the arm 62 to the right breaking the contact of the spring 65 and the button 66.

It will be understood that the interlocking shoulders of hubs 57 and 60 will not permit of both armature 56 and arm 61 being in an upper position at the same time so that after the shear has lifted the contact spring 65 it is subsequently restored to normal position of contact with button 66 upon the spring 69 lifting the armature 56 after its being released by the magnets.

In order to prevent any overrunning of the disk 71 and consequent entire or partial closing of the shear 12 after the disk 71 has been released from the magnetic clutch, and to insure the shearing means stopping in open position, I prefer to provide an air dash-pot means 75 in connection with the two blades 11, 12 of the shearing means. This dashpot is connected to the two members of the shear by any suitable means such, for instance, as a connection 76 between the piston of the dashpot and the upper blade, and a connection 77 between the cylinder of the dashpot and the lower blade 11. To those skilled in the art and apparatus to which my invention relates, many alterations and widely differing embodiments and applications thereof will suggest themselves without departing from the spirit and scope of the invention. My disclosures and the description herein are purely illustrative and are not intended to be in any sense limiting.

I claim:

1. The herein disclosed method of making a tread which consists in feeding a strip of material in a longitudinal direction and while moving folding it into folds of progressively different widths from one side edge to the other side edge.

2. The herein disclosed method of making a tread which consists in feeding a strip of material in a longitudinal direction and while moving folding it into folds of progressively different widths from one side edge to the other side edge with the centers of all the folds in alignment.

3. The method of making a tread which consists in first folding a sheet of rubber compound on longitudinal lines into a multi-ply strip the folds of which are of different widths and finally in pressing all the folds together into a homogeneous body.

4. The method of making a tread which consists in first folding a sheet of rubber in pyramidal folds with the centers of the folds registering and then compressing the same into a homogeneous mass.

5. The method of making a tread which consists in longitudinally moving and supporting on converging supports spaced transversely in uniformly increasing relation a sheet of rubber compound to cause the sheet to fold between the supports as the sheet moves along into sections of different widths, and then pressing the folded sections face to face into a homogeneous mass.

6. The method of making a tread which consists in moving a sheet of rubber compound longitudinally and simultaneously supporting in varying spaced relation longitudinal portions thereof to permit intermediate portions to form folds of different widths, converging the lines of support as the longitudinal movement progresses until folded in a plurality of folds of different widths, holding the several folding portions out of contact with other folds until the folding is completed, and then compressing the folded portions into a homogeneous body.

7. A tire tread forming apparatus having means for feeding a sheet of material and supporting it at points transversely spaced in uniformly increasing relation, means moving in the direction of said feeding means at an angle to and across the plane of movement of said supporting and feeding means and co-acting therewith to fold the sheet into a strip having plies of different widths, and means for compressing the plies into a homogeneous body.

8. A tire tread forming apparatus having means spaced transversely in uniformly increasing relation for supporting and feeding a sheet of material, means spaced transversely in uniformly increasing relation moving in the direction of said feeding means at an angle to and across the plane of movement of said supporting and feeding means and co-acting therewith to fold the sheet into a multi-ply strip, and means for compressing the plies into a homogeneous body.

9. Means for continuously supporting at points disposed transversely in uniformly increasing spaced relation, moving and folding longitudinally a sheet of material into a strip having plies of different widths disposed in face to face relation, in combination with means acting against the outermost plies to compress the plies into a homogeneous body.

10. An apparatus of the class described having longitudinally moving means spaced transversely in uniformly increasing relation a plastic sheet and simultaneously folding said sheet along longitudinal converging lines, fold it into sections or plies of different widths, and means for compressing the folded sheet.

11. An apparatus of the class described having converging endless moving means spaced transversely in uniformly increasing relation for longitudinally supporting a thin sheet of rubber compound while the same is moved longitudinally and for delivering the folded product to compressing means, means for engaging and positioning the folded portions of the sheet between said spaced means, and means for compressing the folded portions together.

12. A tread machine having vertically disposed compressing rolls, means for yieldingly pressing one roll toward the other roll, and a series of supporting, conveying and folding means transversely spaced in uniformly increasing relation and converging toward and adapted to deliver a folded rubber strip to the point of contact of said rolls.

13. A tread machine having vertically disposed compressing rolls, means for pressing one roll toward the other and a series of supporting, conveying and folding means transversely spaced in uniformly increasing relation and converging toward the point of contact of said rolls and adapted to deliver a folded strip to said compressing rolls, said supporting, conveying and folding means being arranged to position the folds of the strip so that the centers of the respective folds register.

14. A tread machine having vertically disposed compressing rolls and a series of supporting, conveying and folding means converging toward the point of contact of said rolls, said means being spaced apart so that the folds formed thereby decrease in width progressively from one side to the other.

15. A tread machine having vertically disposed compressing rolls and folding mechanism for folding a sheet of rubber compound into a plurality of folds and delivering the folded sheet to said rolls, said mechanism including horizontally traveling members spaced transversely in uniformly increasing relation upon which the sheet rests and between which it is folded, said members converging as they move toward said rolls, and means operating between said members to engage the sheet during folding thereof.

16. A tread machine having vertically disposed compressing rolls and folding mechanism for folding a sheet of rubber compound into a plurality of folds of different widths and delivering the same to said rolls, said mechanism including a series of longitudinally converging traveling members spaced from each other transversely in uniformly decreasing relation, and mechanism disposed between said members and engaging the material during the folding thereof.

17. A tread machine having vertically disposed compressing rolls and folding mechanism for folding a sheet of rubber compound into folds of different widths and delivering the folded sheet to said rolls, said mechanism including a series of supporting members spaced from each other transversely in uniformly decreasing relation and extending radially of the point of contact of said rolls, and mechanism operating between said members and engaging the material during the folding thereof.

18. A tread machine having a series of horizontally moving spaced apart cables upon which a sheet of rubber rests and between which portions thereof are folded in combination with compressing means.

19. A tread machine having a series of horizontally moving spaced apart cables upon which a sheet of rubber rests and between which portions thereof are folded, and a second series of cables extending down between the cables of said first series to position the folds and hold the folds from contact with one another during the folding operation, in combination with compressing means to which the folded product is delivered.

20. In a machine for folding sheet material, the combination with a frame, of series of sheaves, endless cables running around said series of sheaves, supports on said frame, and means between each sheave of each series and its support permitting angular adjustment thereof on said support, said cables being supported by said sheaves in converging relation to permit folding of the sheet material.

21. In a tread machine, the combination of a support, a pair of compressing rolls, two sets of spaced sheaves, one of said sets being arranged radially relative to the point of contact between said rolls, cables extending around said sets of sheaves, and means for movably mounting each of the sheaves of the other set in spaced relation whereby they can accommodate themselves to a position to feed a cable in the plane of one of the sheaves of the first mentioned set.

22. In a machine of the class described, the combination of means for feeding, supporting and simultaneously folding a sheet of material into a multi-ply strip, said means comprising sets of sheaves, cables on which the material is supported, extending around said sheaves, and means disposed at an angle to the plane of the sheet of material before it is folded and engaging the outermost plies of the strip for compressing them together.

23. A tread machine having a shaft, a series of sheaves mounted on said shaft upon universal bearings, compressing rolls, a second series of sheaves in proximity to said rolls, cables extending radially to the point of contact of said rolls and about said sheaves, and a second series of cables extending down between first named cables to position and maintain the folds.

24. In a machine for making treads, the combination of a plurality of horizontally extending supporting members disposed in converging relation and adapted to receive a sheet of material at one end, means for moving said members, said members being supported at their receiving ends in uniformly increasing spaced relation transversely from one end member to the other end member to permit intermediate or non-supported portions of the material to progressively fold into sections of different widths as the sheet moves with said members to their converging ends.

25. In a tread making machine means for folding a sheet of rubber into a tread with the folds longitudinally of the tread and successively increasing the widths with the centers of each fold registering, and means for compressing the product into a homogeneous body.

Signed at Los Angeles, California this 24th day of April 1919.

HOWARD I. MORRIS.

Witnesses:
 FREDERICK S. LYON,
 L. BELLE WEAVER.